A. WILCOX.
CREAM DIPPER.
APPLICATION FILED APR. 2, 1909.
950,525.
Patented Mar. 1, 1910.
2 SHEETS—SHEET 1.
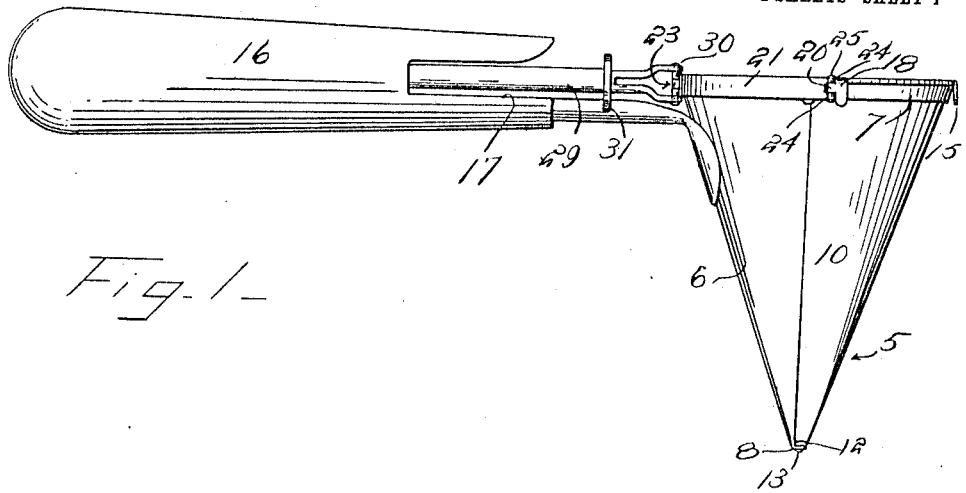
Fig. 1.
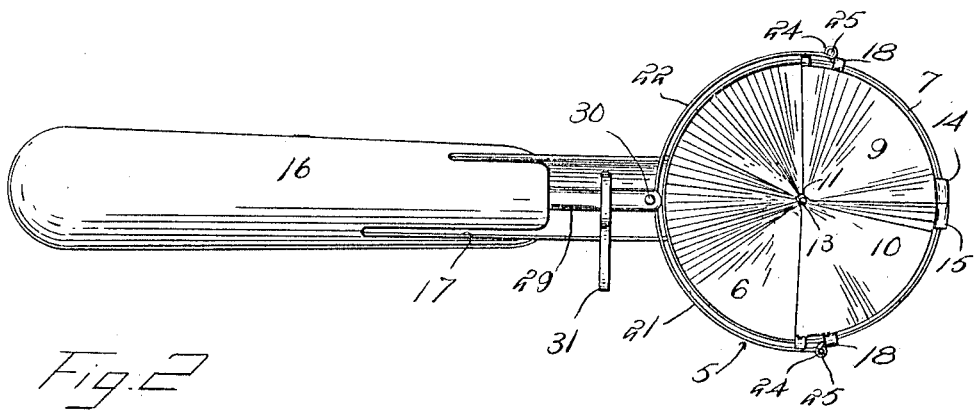
Fig. 2.
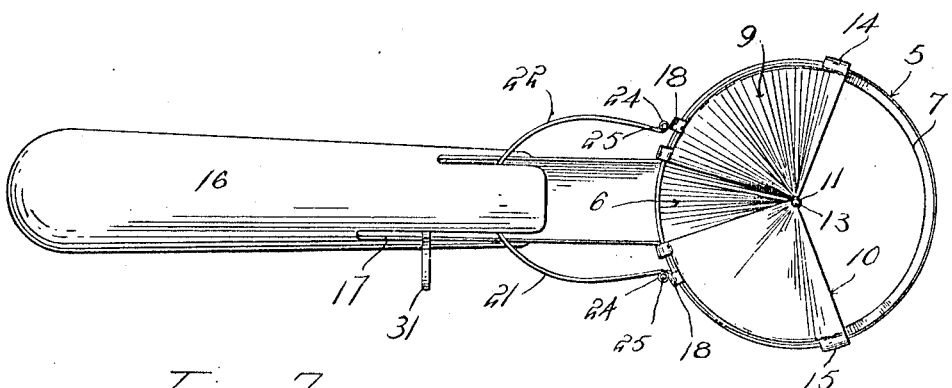
Fig. 3
Witnesses
J. C. Simpson
John A. Donegan
Inventor
Albert Wilcox
By 
Attorneys

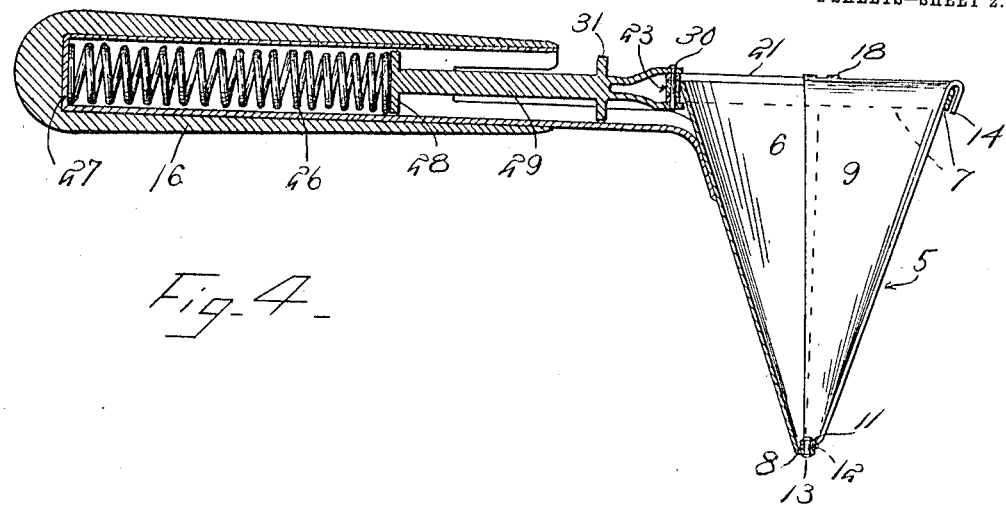
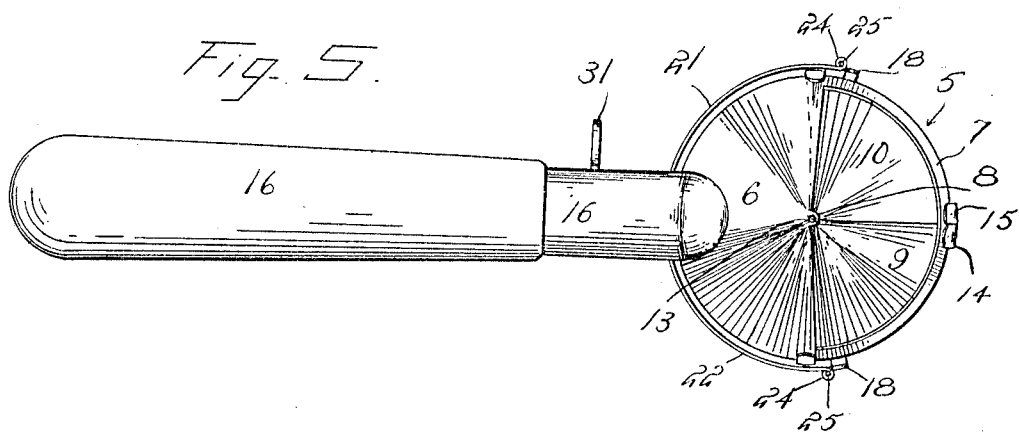
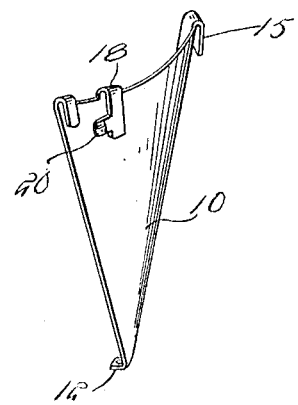

UNITED STATES PATENT OFFICE.

ALBERT WILCOX, OF WHEELING, WEST VIRGINIA.

CREAM-DIPPER.

950,525.

Specification of Letters Patent.

Patented Mar. 1, 1910.

Application filed April 2, 1909. Serial No. 487,383.

*To all whom it may concern:*

Be it known that I, ALBERT WILCOX, a citizen of the United States, residing at Wheeling, in the county of Ohio, State of West Virginia, have invented certain new and useful Improvements in Cream-Dippers; and I do hereby declare the following to be a full, clear, and exact description of the invention, such as will enable others skilled in the art to which it appertains to make and use the same.

This invention relates to improvements in ice cream dippers or molds, such as are employed in dishing cream from a freezer to a plate.

It has for its object the provision of a dipper or mold which may be of any shape, but preferably conical, the base or mouth of which is open to receive the cream from the freezer, and a portion of the side of which is movable so as to present a side opening through which the cream may be discharged to a plate.

Another object is the provision of a means operable from the handle for actuating the movable side to unfold.

A further object is the provision of a means for automatically returning the side to closed position.

With these and other objects in view as will more fully hereinafter appear, the present invention consists in certain novel details of construction and arrangement of parts, hereinafter fully described, illustrated in the accompanying drawings and more particularly pointed out in the appended claims, it being understood that various changes in the form, proportion, size and minor details of the device may be made without departing from the spirit or sacrificing any of the advantages of the invention.

The device consists essentially in a dipper having the shape of a section taken through the axis of a cone, to a point adjacent the base thereof, whereby closed and opened sides are presented. A closure for the open side consists of two sections each approximately one half the area of the closed side and conforming to the shape of the latter. The small ends of these sections are pivoted to the vertex of the closed section, and their remote sides when in closed position are connected by a resilient band. A handle is secured to the closed side of the dipper and a spring actuated plunger is disposed within the handle. The free end of the plunger rod is connected with a resilient band so that when the rod is moved in one direction the movable sections will fold over the closed side by virtue of the opposite ends of the band approaching each other, in this position the cream or other substance within the dipper may be discharged through lateral opening.

In the accompanying drawings forming part of the specification: Figure 1 is a side elevation of the device. Fig. 2 is a plan view thereof. Fig. 3 is a similar view showing the sections folded over the closed side. Fig. 4 is a longitudinal sectional view of the device. Fig. 5 is a bottom plan view. Fig. 6 is a detailed perspective of one of the folding sections.

Similar numerals of reference are employed to designate corresponding parts throughout.

The dipper is designated by the numeral 5 and is preferably of metal and conical in shape. In the present instance the dipper is shown to be the shape of a vertical section taken through the axis of a cone from the apex to a point adjacent the base. With this construction a closed side 6 is formed and that portion of the base disposed in advance of the closed side constitutes a track 7. The apex of the closed side is bent inwardly to provide a lug 8. The open portion of the dipper is normally sealed by two sections 9 and 10, each of which is substantially one half the area of the closed side. The apexes of these sections are bent inwardly to form lugs 11 and 12 which overlap each other and are provided with openings to receive a suitable pivot 13 one end of which enters an opening in the lug 8. Up-turned ears 14 and 15 are formed on the lower edges and adjacent the opposite sides of each of the sections 9 and 10 these ears are spaced from the outer surfaces of the sections and are designed to straddle the track 7, extending in advance of the closed side 6. Thus it will be seen that the sections 9 and 10 may be moved in opposite directions and folded over the inner or concaved surfaces of the closed side 6.

A suitable handle is designated by the numeral 16 and in the present instance is shown to be tubular and provided with a horizontally disposed transverse recess 17 extending from the point of contact with the dipper to a point adjacent the horizontal center of the handle.

The actuating mechanism for the sections 9 and 10 which will cause these sections to fold over the closed side 6 and to return automatically to closed position will now be described.

An upturned lug 18 is formed on the outer face and adjacent the inner edge of each of the sections 9 and 10, and projecting from the rear edge of each of these upturned lugs are a pair of knuckles 20. A metallic strip formed of two sections 21 and 22 hinged together, as shown at 23, has its outer or free ends provided with knuckles 24 to interlock with the knuckles 20 of the lugs 18, these knuckles receive a suitable pintle 25. Disposed in the handle 16 is a coil spring 26, one terminal of which bears on the rear closed end of the handle 27, a plunger 28 is shown at the opposite end of the spring 26, and connection between the plunger and strip is established by means of a plunger rod 29, one end of which is secured to the plunger 28 and the opposite end of which is provided with jaws adapted to straddle the strip at a point in alinement with the hinged connection of the latter, the said jaws being provided with openings for the reception of a pintle 30 which enters the sections 21 and 22. A suitable finger piece 31, is secured to the plunger rod adjacent the jaws, this finger piece being of a width to slidingly fit in a recess 17 of the handle. Thus it will be seen when the finger piece is pressed rearwardly against the action of the spring 26 it will carry with it the plunger rod and sections 21 and 22; by virtue of the connections between the latter and the sections 9 and 10, the latter will move in opposite directions and fold upon the closed side 6, it can be seen that during this movement the outer ends of the sections 21 and 22 owing to the hinged connection between the inner ends will approach each other, whereby the sections 9 and 10 will be permitted to fold over the section 6 until their inner edges meet.

It can be readily seen with a device of this kind that the usual method of actuating a scraper to dislodge the cream from the inner face of the dipper will be dispensed with, and at the same time an opening will be presented through which the cream may fall if desired or it may be ejected through the mouth of the dipper in the usual manner. When it is desired that the cream shall follow the latter course it is evident that it will be discharged more rapidly than with devices of this kind now in use, due to the fact that when the sections 9 and 10 are moved inwardly they will dislodge themselves from that portion of the cream with which they were first in contact and at the same time come between the body of the cream and the inner surface of the closed side 6, thereby dislodging the cream from the latter side. This movement will cause more or less displacement in the body of the cream and the latter will at once drop either through the side opening or the mouth of the dipper as desired.

Having thus described my invention, what is claimed as new, is:

1. A cream dipper having a closed and an open side, and a pivoted closure for the open side comprising oppositely moving sections foldable over the closed side.

2. A cream dipper having a closed and an open side, and a pivoted closure for the open side comprising oppositely moving sections foldable over the inner face of the closed side.

3. A cream dipper having a closed and an open side, and a pivoted closure for the open side comprising a pair of oppositely moving sections foldable over the inner face of the closed side.

4. A cream dipper having a closed and an open side, a pivoted closure for the open side comprising a pair of sections having ears to engage the face of the dipper and foldable in opposite directions over the inner face of the closed side.

5. A cream dipper having a closed and an open side, a pair of sections forming closures for the open side and having their upper ends pivoted to the outer end of the closed side and their lower ends provided with ears for engagement with the base of the dipper and means for moving said sections in opposite directions to fold over the closed side.

6. A cream dipper having a closed and an open side, a handle combined with said closed side, a closure for the said open side consisting of two sections, and means operable from the handle to actuate said sections to move in opposite directions over the said closed side.

7. A cream dipper having a closed and an open side, a handle combined with said closed side, a closure for said open side comprising a plurality of pivoted sections, a spring pressed plunger rod in said handle and a connection between said plunger rod and said closure sections for actuating the latter to move in opposite directions and fold over the said closed side.

In testimony whereof, I affix my signature, in presence of two witnesses.

ALBERT WILCOX.

Witnesses:
HENRY OERTERLE,
THOS. H. WILLIAMS.